(No Model.)

G. T. CHILDS.
CUTTER AND PUNCH ATTACHMENT FOR ANVILS.

No. 254,532. Patented Mar. 7, 1882.

Witnesses
Geo. H. Strong.
Frank A. Brooks

Inventor
George T. Childs
By Dewey & Co.
Att'ys

UNITED STATES PATENT OFFICE.

GEORGE T. CHILDS, OF LOOKOUT, CALIFORNIA.

CUTTER AND PUNCH ATTACHMENT FOR ANVILS.

SPECIFICATION forming part of Letters Patent No. 254,532, dated March 7, 1882.

Application filed August 5, 1881. (No model.)

*To all whom it may concern:*

Be it known that I, GEO. T. CHILDS, of Lookout, Inyo county, and State of California, have invented certain Improvements in Attachments for Blacksmiths' Anvils; and I hereby declare the following to be a full, clear, and exact description thereof, reference being had to the accompanying drawings, making part of this specification, in which—

Figure 1:
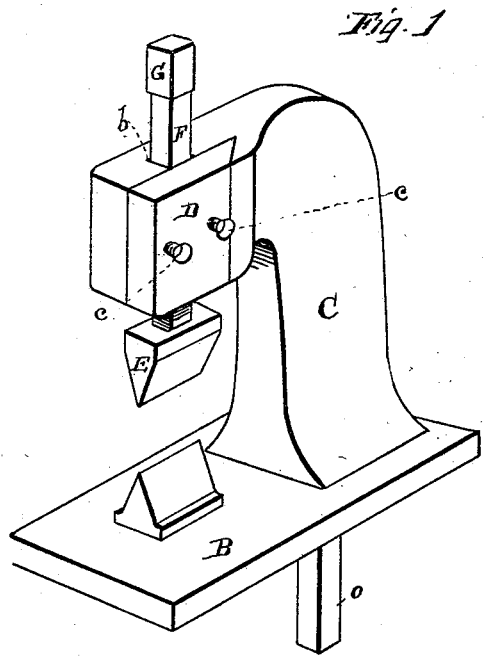
Figure 2:
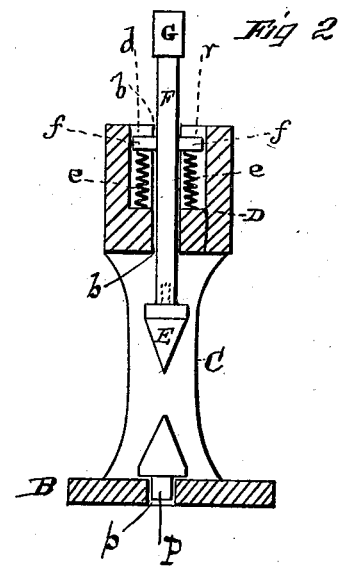

Figure 1 is a perspective view of my device. Fig. 2 is a vertical cross-section.

My invention relates to that class of anvil attachments designed to hold cutters or punches to be operated upon by the smith's hammer, wherein a bracket having a hollow head is provided with a tool-holding shank, to which is secured a cross-head, and beneath which are coil-springs.

The object of my invention is to provide a means for readily removing the tool-holding shank from the head of the bracket; and it consists in a bracket provided with a hollow head for the reception of a tool-holding shank, cross-head, and springs, combined with a removable securing-plate, whereby the tool-holding shank can be removed and replaced with facility.

In the said drawings, B is the base-plate, from which rises the curved bracket C, and is provided with a stud, *o*, to enter the "hardy-hole" of an anvil. The head of the bracket C is chambered to receive a cross-head, *f*, attached to the tool-holding plunger F and coil-springs *e*. The tool-holder and cross-head are inserted from the side of the head through the medium of a removable plate, D, which covers the opening in the side of the chambered head and is fastened by set-screws *c*. The facility with which this plate D can be placed and replaced renders a quick interchanging of tools comparatively easy.

I am aware that various kinds of devices of this description have been heretofore known and used. Hence I make no broad claim to the general construction of the anvil attachment; but,

Having thus described my invention, I claim as my improvement to punching and cutting attachments to anvils—

The chambered bracket C, provided with the cross-head *f* and springs *e*, the removable plate D, and tool-stock F, all constructed, arranged, and operated substantially as described.

In witness whereof I have hereunto set my hand.

GEORGE T. CHILDS.

Witnesses:
WM. HANNAN,
N. P. REID.